Sept. 22, 1925.

F. STRAUSS

CHILD'S VEHICLE

Filed Jan. 29, 1925

1,554,240

INVENTOR
Ferdinand Strauss
BY
ATTORNEY

Patented Sept. 22, 1925.

1,554,240

UNITED STATES PATENT OFFICE.

FERDINAND STRAUSS, OF NEW YORK, N. Y.

CHILD'S VEHICLE.

Application filed January 29, 1925. Serial No. 5,616.

*To all whom it may concern:*

Be it known that I, FERDINAND STRAUSS, a citizen of the United States of America, residing at New York city, county of New York, and State of New York, have invented certain new and useful Improvements in Children's Vehicles, of which the following is a specification.

This invention relates to children's vehicles and in particular to the type adapted to be propelled by pushing with the feet.

A particular object of the invention is to provide a vehicle, the operation of which will strengthen the legs of the child and on which is made to simulate an automobile whereby amusement will be afforded the child.

A further object of the invention is to provide a vehicle having a body thereon made to simulate an automobile, the body being so shaped that it will prevent the spreading of the child's legs during the operation or running of the vehicle and thus eliminate the danger of injury thereto.

A still further object is to provided a compact vehicle which will not be cumbersome, but may be carried or pushed by the child and which will be light and durable.

A still further object is to provide a steering post for such a vehicle which can be broken and folded so that it will be out of the way, or can be used in folded position by the child for steering the vehicle.

Referring to the drawing, wherein I have illustrated a preferred embodiment of my invention:

Figure 1:
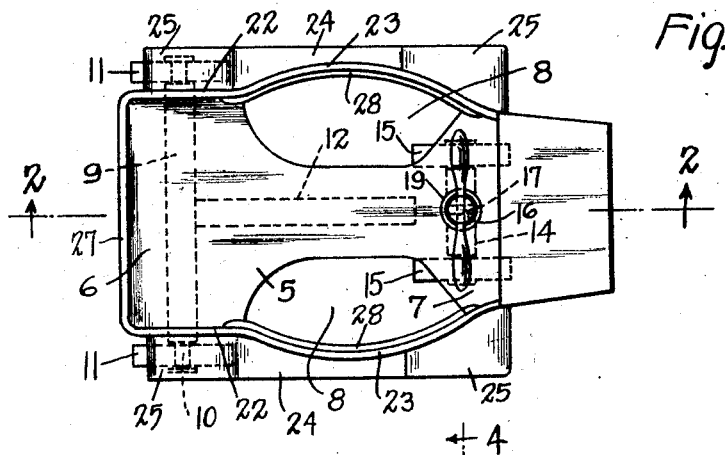
Figure 1 is a top plan view of a vehicle constructed in accordance with my invention.

Referring to the drawing in detail 5 indicates the base or bottom portion of a child's vehicle which can be constructed of any suitable material such as wood or metal. The bottom 5 is wider at the back 6 than at the front 7, the back 6 forming the seat while the front 7 forms a place where the child may place his feet when the vehicle is running down grade. The mid-portion of the bottom 5 is provided with side cut out portions 8 which are preferably shaped to conform to the shape of the upper parts of the child's legs and which allow the legs to extend therethrough to propel the vehicle by pushing. The under side of the seat 6 is provided with a transversely disposed depending portion 9, the ends of which form wheel carrying axles 10, the wheels 11 being held in place thereon in any suitable manner. A central bracing member 12 is disposed beneath the reduced portion of the bottom 5 and connects at its rear end with the depending portion 9 to retain the same in place.

Figure 2:
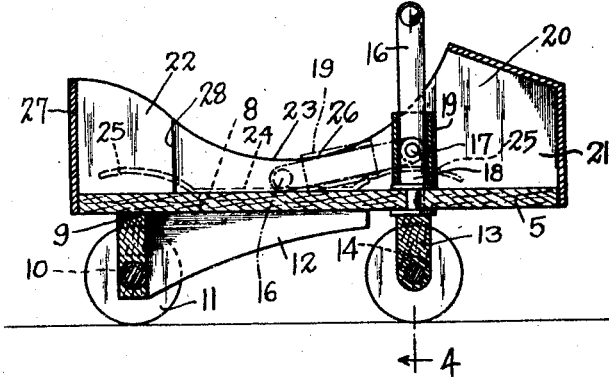
Figure 2 is a section in side elevation taken on the line 2—2 of Figure 1.
Figure 3:
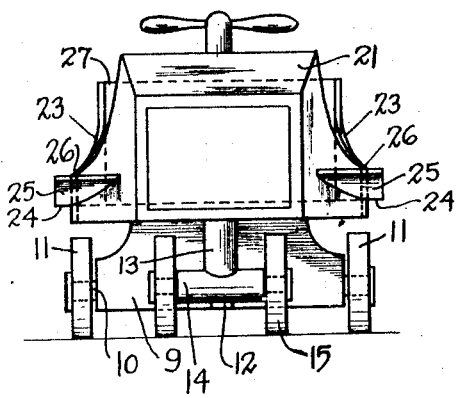
Figure 3 is a front view in elevation of the vehicle showing the relative location of the front and rear wheels.
Figure 4:
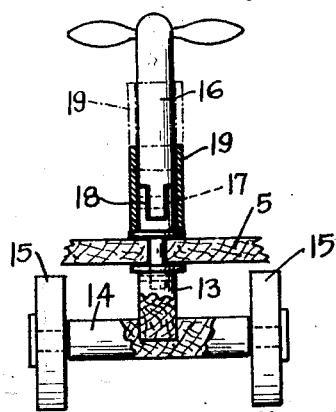
Figure 4 is an enlarged section taken on the line 4—4 of Figure 2 and shows in detail the steering post construction.

The front 7 of the bottom 5 has a vertical stering post passing therethrough, the lower part 13 thereof being provided with a cross piece 14 which carries the two forward wheels 15, it being understood that one forward wheel may be used if desired. The upper part 16 of the steering post is pivoted at 17 in the forked upper end 18 of the lower part 13 of the steering post, the pivot point and adjacent post parts being surrounded by a loosely fitting sleeve 19 which will, when disposed in the position shown in Figure 4 prevent the post from folding or breaking at the pivot point 17. When the sleeve is moved to the position shown in outline in Figure 4, the post may be folded down to the position shown in outline in Figure 2; so that it will be out of the way. Also at any angular position the post may be used to steer the vehicle so that when coasting the child may lean back.

It will be understood that the construction of the bottom of the vehicle and its associated parts may be made of wood or metal as desired, and if metal is used the parts will be made by pressing out of sheet steel and suitably cutting, bending or punching the same to allow assembly thereof.

In order to simulate an automobile I may suitaby secure to the bottom 5 or form integral therewith an upper side frame 20; formed at the front of the vehicle to provide the usual hood-like structure 21, the same being of course hollow in this instance, and providing a covering for the forward part 7 of the vehicle to protect the child's feet when he places them up in position to allow the vehicle to coast. The sides 22 of the frame adjacent the cut out portions 8 of the bottom 5 are bulged as at 23 to allow the free movement of the child's legs, but at the same time provide a support for the same to prevent spreading and possible injury to the child. The sides 22 may be provided with the running boards 24 and mudguards 25, and be so shaped as to be lowest at their mid portions as at 26 so that the child may conveniently step into the vehicle. The back 27 of the frame will act as a support for the lower part of the child's back. The inner sides of the bulged portions 23 may be covered with a felt pad 28 which will prevent injury to the child's legs or clothing.

The bottom 5 of the vehicle is relatively low, thus affording stability; and the upper frame part 20 thereof together with the outwardly projecting running board protects the child's body and legs should the vehicle be bumped, or run into something as is often the case when small children are coasting; thereby eliminating the danger of injury to the child.

It will be evident therefore that I have provided a child's vehicle which will afford pleasure, protect the child and be light and durable.

Having described my invention what I claim is:

1. A vehicle for children comprising a bottom portion, wheels on said bottom portion, a substantially arcuate shaped side frame associated therewith, the bottom being provided with cut outs, said side frame being bulged outwardly in the portions adjacent said cut outs.

2. A vehicle for children comprising a wheeled bottom portion, a side frame having arcuate side cut-outs associated with said bottom, said frame being bulged outwardly at its midportion, and means for steering said vehicle.

3. A wheeled vehicle for children comprising a body portion having leg openings in the bottom thereof, a steering member extending through said body portion, a part of which is pivoted and adapted to be moved out of vertical alignment at said pivot point, a sleeve member slidable longitudinally of said steering member and adapted to normally retain the parts of the latter in vertical alignment, and a side frame on said body having its central portion bulged outwardly.

4. A wheeled vehicle for children comprising a bottom, a two-part steering post passing therethrough, the upper and lower parts of the steering post being pivotally connected, whereby the upper part may be folded against the bottom, and a sleeve slidable longitudinally of said post, and adapted when in position over said pivot point to retain the upper part of the post in alignment with the lower part, a side frame on said vehicle, and running boards disposed on the outer sides of said side frame.

5. A wheeled vehicle for children, comprising a bottom portion, a side frame associated therewith, the side frame being arranged to provide a covering for the forward part of said bottom portion, whereby the feet of the child when resting on said forward part will be protected, and running boards on said side frame, the running boards being curved upwardly at their ends to simulate mud guards.

In testimony whereof I hereunto affix my signature.

FERDINAND STRAUSS.